Figure 5:
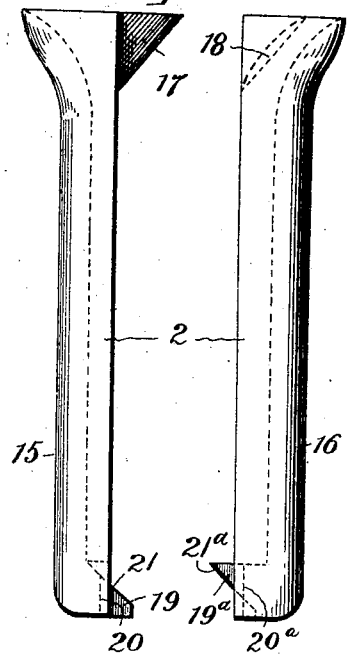

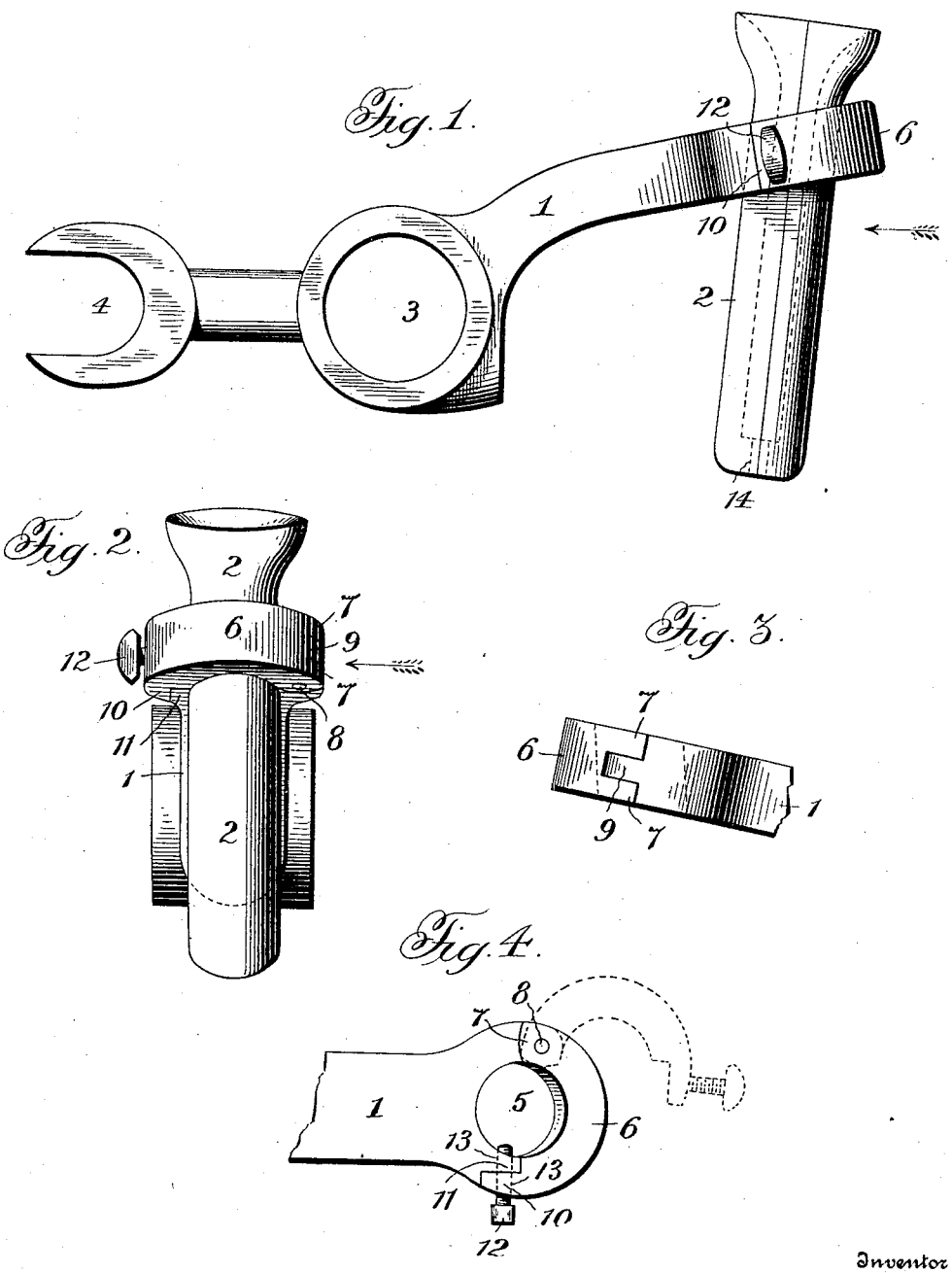

No. 809,437. PATENTED JAN. 9, 1906.
D. C. FINNEY.
THREAD GUIDE.
APPLICATION FILED JULY 29, 1903. RENEWED DEC. 7, 1905.

2 SHEETS—SHEET 2.

Witnesses
Jas. E. Hutchinson
Calvin V. Milans

Inventor
David C. Finney,
By Royal E. Burnham,
Attorney

UNITED STATES PATENT OFFICE.

DAVID C. FINNEY, OF HUNTSVILLE, ALABAMA.

THREAD-GUIDE.

No. 809,437.　　　Specification of Letters Patent.　　　Patented Jan. 9, 1906.

Application filed July 29, 1903. Renewed December 7, 1905. Serial No. 290,753.

*To all whom it may concern:*

Be it known that I, DAVID CARSON FINNEY, a citizen of the United States, residing at Huntsville, in the county of Madison and State of Alabama, have invented certain new and useful Improvements in Thread-Guides, of which the following is a specification, reference being had therein to the accompanying drawings.

This invention relates to guides for fiber, yarn, thread, or other material, and while particularly designed for use on warping-machines it is also susceptible of many other adaptations, as will be apparent from the detail description hereinafter and the appended claims.

The guides or trumpets heretofore used on warping and other textile machinery are not easily threaded, and, furthermore, when it is desired to repair certain parts of the machinery it is necessary either to repair these parts while on the machines, and thereby incur injury by grease or otherwise to the material being operated upon, or to cut the material to remove the parts, which is also objectionable.

One object of the invention is to provide a guide with means whereby the guide can be readily threaded or unthreaded and removed from the thread and the machine of which it is a part without cutting the thread or in any manner injuring the same.

Further, the invention is intended to provide means for holding the guide, whereby the same can be easily removed from and replaced upon the machine without incurring cutting or other damage to the material being operated upon.

Means are also provided for simultaneously locking the guide-holding means and securing the guide therein.

Provision is also made for clamping and holding the parts of the guide together by the same means which are employed for securing the guide to the machine.

Further, the guide is so constructed that its parts when fitted together are held in proper relation to each other and in such manner that the material passing through the guide will not become fouled therein.

The invention also comprehends the provision of means whereby a number of guides or a number of guides and their holding means may be simultaneously removed from or replaced upon the machine without in any manner interfering with or damaging the material being operated upon.

An embodiment of the invention as applied to a warping-machine possessing all of the foregoing desirable characteristics is delineated for purposes of illustration in the accompanying drawings, forming part hereof and upon inspection of which novel details in the construction and arrangement of the various parts of the invention will be apparent.

In the drawings like reference characters refer to corresponding parts in the several views, of which—

Figure 6:
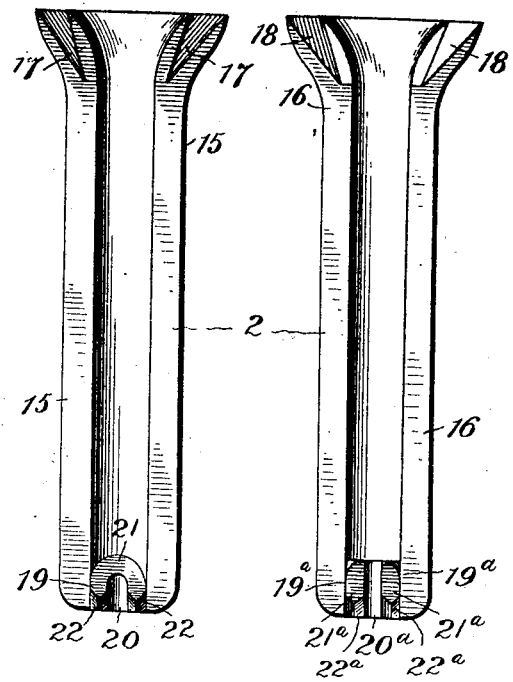
Figure 7:
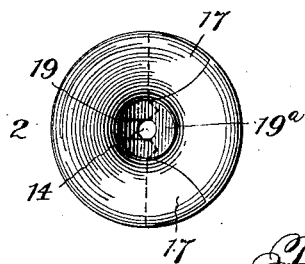
Figure 8:
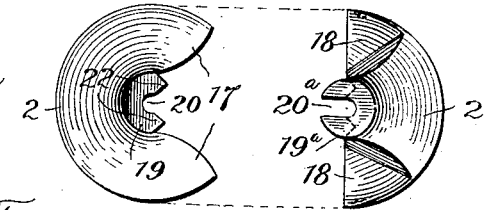
Figure 9:
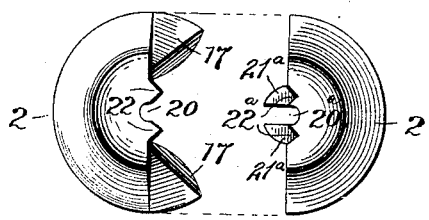

Figure 1 is a side view of the guide and its holding means. Fig. 2 is an end view of the same looking in direction of the arrow, Fig. 1. Fig. 3 is a side view of so much of the holding means as includes the guide-holding eye looking in direction of the arrow, Fig. 2. Fig. 4 is a top view of the same, the swinging member of the eye being shown in dotted lines swung outwardly. Fig. 5 is a view of the guide, showing the sections thereof separated. Fig. 6 is a view showing the interior of the sections of the guide. Fig. 7 is a top view of the guide. Fig. 8 is a similar view thereof, showing the sections separated. Fig. 9 is a bottom view of the guide, showing the sections separated.

Referring more particularly to the drawings, 1 designates a member for holding and operating a thread-guide 2 of a warping-machine, the member 1 being provided with journals 3 and 4 to permit proper actuation of the same and with a guide-holding eye 5. Ordinarily a shaft passes through journals 3 of a number of guide-supporting members 1, and journals 4 thereof are so constructed that said shaft can be removed from the machine and the guide-supporting members thereon released from contact with the actuating means operating in journals 4. The guide-holding eye 5 of member 1 is formed with a swinging section 6, having integral hinge-arms 7, secured by pin 8 to an integral arm 9 of said member, and on the opposite side of eye 5 section 6 is formed with a mortise portion 10 fitting on a corresponding portion 11 of member 1. A set-screw 12 passes through screw-threaded apertures 13 of portions 10 and 11 for holding section 6 in closed position and for the further purpose of securely holding guide 2 in said eye, as will be more fully explained hereinafter.

Guide 2 comprises a hollow cylinder with a flaring upper end portion and closed at the lower end, except for aperture 14, the guide being designed for the ready passage of thread or other like material therethrough. The guide 2 is formed of separable sections 15 and 16, arranged to fit closely together and always in the same relative positions. One of said sections—as, for instance, section 15—is provided at its flaring end with projecting leaves or leaf portions 17, preferably made integral with said section and arranged to register with and fit closely in recesses 18 in the corresponding end of section 16, the construction being such that the flaring end of the guide when the sections are fitted together presents the appearance of being made of one piece and danger of the material passing through the guide becoming caught between the sections being obviated.

The lower end of section 15 is formed with a part 19, which closes the lower hollow portion of said section, except for a longitudinal semicylindrical groove 20. Part 19 is made with a downwardly-inclining upper surface 21 and projects beyond its section and with the groove 20 serves to form fingers 22, which have wedge-shaped ends. At its lower end section 16 is formed with a part 19$^a$, which closes the hollow portion of said section, except for a longitudinal semicylindrical groove 20$^a$. Part 19$^a$ is made with an upwardly-inclining under surface 21$^a$, of a similar angle to the longitudinal line of the guide, as surface 21, and projects beyond section 16. The lower portion of part 19$^a$ also includes inwardly-inclining surfaces designed to form with the wall of section 16 V-shaped recesses 22$^a$. When sections 15 and 16 are fitted together, surface 21 registers with surface 21$^a$, fingers 22 seat in recesses 22$^a$, and semicylindrical grooves 20 and 20$^a$ form the cylindrical aperture 14, the whole making a complete closure with a longitudinal cylindrical aperture for the lower end of the guide and so relatively constructed that the material passing therethrough is not apt to catch between the sections.

It will be readily seen that the leaf portions 17 will prevent section 16 slipping above section 15, that the engagement of surfaces 21 and 21$^a$ with each other will prevent section 15 slipping above section 16, and that the projections of parts 19 and 19$^a$ into the opposite sections, respectively, and the leaf portions 17 projecting into section 16 will prevent one section sliding upon the other.

When it is desired to place guide 2 on guide-holding member 1, section 6 of eye 5 is opened, guide 2 placed in the eye, and section 6 closed and locked by set-screw 12. Guide 2 is not only held in position and the sections thereof held together by eye 5 when section 6 is closed, but set-screw 12 is made of sufficient length to pass entirely through portions 10 and 11 and engage the guide and hold it in position, especially against vertical movement.

A machine which has guides and guide-holding means such as described above and having warp or other threads passing through the guides can have the guides removed therefrom for the purpose of repair or for any other purpose by opening section 6, withdrawing guide 2 from eye 5, and separating the sections of the guide and releasing the thread, it not being necessary to cut or otherwise interfere with the material passing through the guide, and when it is desired to remove the shaft passing through journal 3 and a number of guide members thereon the guides can be removed as stated, when the whole set of guide-holding members is released from the material and can be withdrawn from the actuating means operating in journals 4 and from the machine. One guide or a whole set of guides and guide-holding members can be replaced on the machine by shutting the guide-sections over the material and inserting the guides in the eyes.

Having thus described my invention, what I claim as new, and desire to secure by Letters Patent, is—

1. A sectional guide for fiber, yarn, thread or other material having a flaring end, one section thereof being provided at its flaring end with means for engaging the interior of the flaring end of another section, whereby said sections are held in proper relation to each other.

2. A guide for fiber, yarn, thread or other material, comprising longitudinally-disposed separable sections and having a flaring end, one section thereof being provided at its flaring end with means for engaging the interior of the flaring end of another section, whereby said sections are held in proper relation to each other.

3. A sectional guide for yarn, fiber, thread or other material having a flaring end, one section thereof being provided at its flaring end with means for engaging recesses in the flaring end of another section, substantially as described.

4. A guide for yarn, fiber, thread or other material, comprising longitudinally-disposed separable sections and having a flaring end, one section being provided at its flaring end with means for engaging recesses in the flaring end of another section, substantially as described.

5. A sectional guide for yarn, fiber, thread or other material having a flaring end, one section thereof being provided at its flaring end with projecting leaves for engaging the flaring end of another section, substantially as described.

6. A guide for yarn, fiber, thread or other material, comprising longitudinally-disposed separable sections and having a flaring end, one section being provided at its flaring end with projecting leaves for engaging the flaring end of another section, substantially as decribed.

7. A sectional guide for yarn, fiber, thread or other material having a flaring end, one section thereof being provided at its flaring end with projecting leaves for engaging recesses in the flaring end of another section, substantially as described.

8. A guide for yarn, fiber, thread or other material, comprising longitudinally-disposed separable sections and having a flaring end, one section being provided at its flaring end with projecting leaves for engaging recesses in the flaring end of another section, substantially as described.

9. A hollow sectional guide for fiber, yarn, thread or other material, one section thereof having fingers near one end arranged to engage the interior of the corresponding end of another section, substantially as described.

10. A hollow guide for fiber, yarn, thread or other material, comprising longitudinally-disposed separable sections, one section thereof having fingers near one end arranged to engage the interior of the corresponding end of another section, substantially as described.

11. A hollow sectional guide for fiber, yarn, thread or other material, one section thereof having wedge-shaped fingers near one end arranged to engage the interior of the corresponding end of another section, substantially as described.

12. A hollow guide for fiber, yarn, thread or other material, comprising longitudinally-disposed separable sections, one section thereof having wedge-shaped fingers near one end arranged to engage the interior of the corresponding end of another section, substantially as described.

13. A hollow sectional guide for fiber, yarn, thread or other material, one section thereof having near one end an inclined surface arranged to seat on an inclined surface near the corresponding end of another section, substantially as described.

14. A hollow guide for fiber, yarn, thread or other material, comprising longitudinally-disposed separable sections, one section thereof having near one end an inclined surface arranged to seat on an inclined surface near the corresponding end of another section, substantially as described.

15. A sectional guide for fiber, yarn, thread or other material, one section thereof being provided with an inclined surface and projecting fingers, and another section opposite said first-mentioned section thereof being provided with an inclined surface and recesses arranged to seat the surface and fingers of its opposite section, substantially as described.

16. A guide for fiber, yarn, thread or other material, comprising longitudinally-disposed separable sections, one section being provided with an inclined surface and projecting fingers, and another section opposite said first-mentioned section being provided with an inclined surface and recesses arranged to seat the surface and fingers of its opposite section, substantially as described.

17. A sectional guide for fiber, yarn, thread or other material, having a separable end closure therein provided with an aperture, substantially as described.

18. A guide for fiber, yarn, thread or other material, comprising longitudinally-disposed separable sections, and having a separable end closure therein provided with an aperture, substantially as described.

19. A sectional guide for fiber, yarn, thread or other material, having in one end a longitudinally-perforated closure comprising separable sections, substantially as described.

20. A guide for fiber, yarn, thread or other material, comprising longitudinally-disposed separable sections, and having in one end a longitudinally-perforated closure comprising separable sections.

21. A sectional guide for fiber, yarn, thread or other material, having in one end a longitudinally-perforated closure, said closure comprising sections separable along a line at an angle to said perforation, substantially as described.

22. A guide for fiber, yarn, thread or other material, comprising longitudinally-disposed separable sections, and having in one end a longitudinally-perforated closure, said closure comprising sections separable along a line at an angle to said perforation, substantially as described.

23. The combination of a sectional guide for fiber, yarn, thread or other material, and a holder therefor comprising an eye having a swinging arm for opening and closing said eye, and means for securing said arm in closed position and engaging the guide, substantially as described.

24. The combination of a sectional guide for fiber, yarn, thread or other material, and a holder therefor comprising an eye having a swinging arm for opening and closing said eye, and means on said arm for securing it in closed position and engaging the guide, substantially as described.

25. The combination of a sectional guide for fiber, yarn, thread or other material, and a holder therefor comprising an eye having a swinging arm for opening and closing said eye, and a set-screw for securing said arm in closed position and engaging the guide, substantially as described.

26. The combination of a sectional guide for fiber, yarn, thread or other material, and a holder therefor comprising an eye having a swinging arm for opening and closing said eye, and a set-screw on said arm for securing it in closed position and engaging the guide, substantially as described.

27. The combination of a sectional guide for fiber, yarn, thread or other material, and a holder therefor comprising an eye having a swinging arm hung by a hinge-joint to the main portion of said holder for opening and closing the eye, and means for securing said arm in closed position and engaging the guide, substantially as described.

28. The combination of a sectional guide for fiber, yarn, thread or other material, and a holder therefor comprising an eye having a swinging arm hung by a hinge-joint to the main portion of said holder for opening and closing the eye, and means on said arm for securing it in closed position and engaging the guide, substantially as described.

29. The combination of a sectional guide for fiber, yarn, thread or other material, and a holder therefor comprising an eye having a swinging arm hung by a hinge-joint to the main portion of said holder for opening and closing the eye, and a set-screw for securing said arm in closed position and engaging the guide, substantially as described.

30. The combination of a sectional guide for fiber, yarn, thread or other material, and a holder therefor comprising an eye having a swinging arm hung by a hinge-joint to the main portion of said holder for opening and closing the eye, and a set-screw on said arm for securing it in closed position and engaging the guide, substantially as described.

31. The combination of a sectional guide for fiber, yarn, thread or other material, and a holder therefor, said holder having means whereby it can be released from its actuating means, and comprising means for simultaneously releasing said guide from said holder and the material passing therethrough, substantially as described.

32. The combination of a sectional guide for fiber, yarn, thread or other material, and a holder therefor, said holder having means whereby it can be released from its actuating means, and comprising an eye having a swinging arm for opening and closing said eye, and means for securing said eye in closed position and engaging the guide, substantially as described.

33. The combination of a sectional guide for fiber, yarn, thread or other material, one section thereof being provided with an inclined surface and projecting fingers, and another section thereof opposite said first-mentioned section being provided with an inclined surface and recesses arranged to seat the surface and fingers of its opposite section; and a holder for said guide comprising an eye having a swinging arm hung by a hinge-joint to the main portion of said holder for opening and closing said eye, and a set-screw on said arm for securing it in closed position and engaging the guide, substantially as described.

In testimony whereof I affix my signature in presence of two witnesses.

DAVID C. FINNEY.

Witnesses:
N. B. BUCHANAN,
R. F. NEIL.